United States Patent

[11] 3,587,342

| [72] | Inventor | Takeo Yamazaki<br>Kariya, Japan |
|---|---|---|
| [21] | Appl. No. | 838,124 |
| [22] | Filed | July 1, 1969 |
| [45] | Patented | June 28, 1971 |
| [73] | Assignee | Aisin Sicki Kabushiki Kaisha, Kariya,<br>Aichi, Japan |
| [32] | Priority | July 6, 1968 |
| [33] | | Japan |
| [31] | | 43/57540 |

[54] FOOT-OPERATED HAND-RELEASED PARKING BRAKE
5 Claims, 1 Drawing Fig.

[52] U.S. Cl. .................................................. 74/540
[51] Int. Cl. .................................................. G05g 5/06

[50] Field of Search ........................................... 74/540, 541, 542, 539

[56] References Cited
UNITED STATES PATENTS
2,727,405   12/1955   Moen ............................ 74/540

Primary Examiner—Milton Kaufman
Attorney—Pierce, Scheffler & Parker

ABSTRACT: A foot-operated and hand-released parking brake operating mechanism having a pedal at the end of which is provided a segmental ratchet eccentric to the center of rotation thereof, and a pawl that is spring biased to the ratchet segment for engagement with it to be retracted against the action of said spring pulling out a handle on a rod, whereby any moderated amount of release can be obtained.

PATENTED JUN28 1971
3,587,342
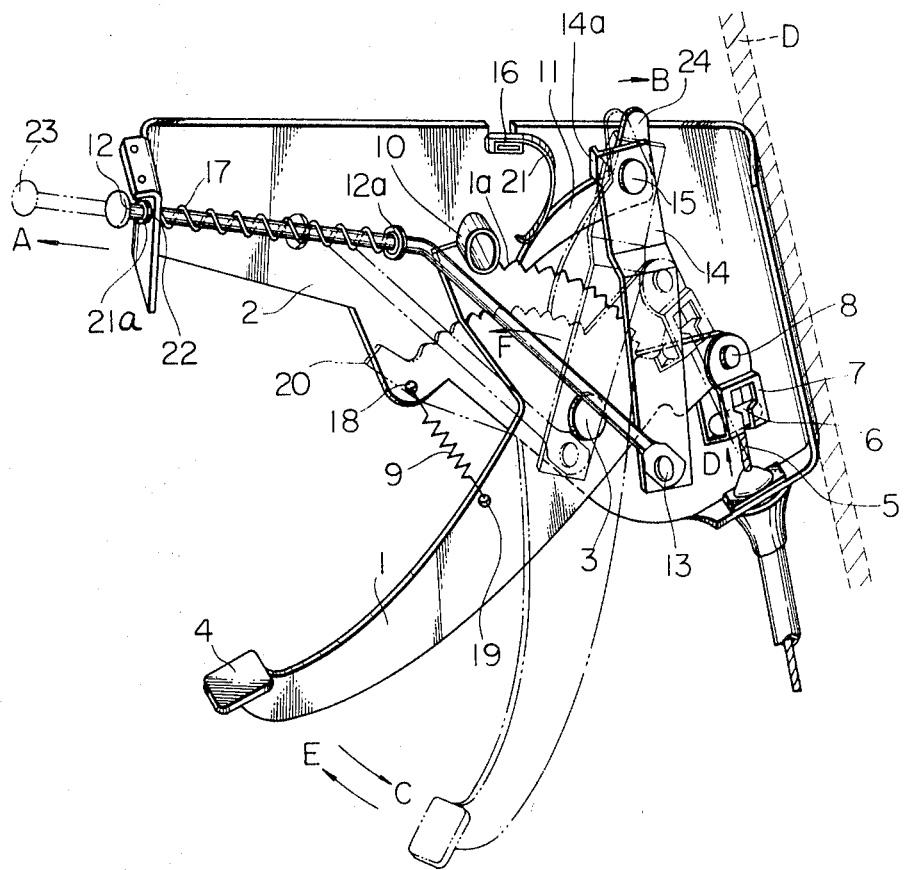
INVENTOR
Takeo Yamazaki
BY
Pirie, Scheffler & Parker
ATTORNEYS

FOOT-OPERATED HAND-RELEASED PARKING BRAKE

BACKGROUND OF THE INVENTION

This invention relates to parking brakes for motor vehicle and is more particularly concerned with one that is foot operated and has a hand release.

The foot-operated and hand-released brakes are known in the art, but in such brakes, a moderate amount of release suitable for starting of travel on an inclined road without stopping the engine permitting uncontrolled speed, that is a middle position of the brake between the fully applied position and a fully released position is not obtainable.

Therefore, it is the principal object of the present invention to provide an improved hand-operated release which is simpler and more dependable, being particularly suitable for acquiring a proper braking torque when starting travel on an inclined road.

SUMMARY OF THE INVENTION

In the parking brake of the present invention, a brake pedal is arranged at one end of a pivoted arm, the other of which is provided a segmental ratchet eccentric to the center of the pivot of the arm, and is provided with a pawl that is spring biased to engage said ratchet segment and to be retracted against the action of said spring by pulling out a handle on a rod mounted for reciprocation.

BRIEF DESCRIPTION OF THE DRAWING

The invention is illustrated in the accompanying drawing, in which, the FIGURE is a perspective view of a parking brake assembly shown in two positions as made in accordance with the present invention.

DESCRIPTION OF THE PREFERRED EMBODIMENT

Referring now to the drawing, the reference character 2 designates a sheet metal supporting bracket of generally triangular form that is adapted to be bolted at its forward end to the dash D by means of conventional studs or bolts and also to be secured at its rear end to the bottom of the instrument board by means of conventional bolts or studs. The parking brake pedal 4 is mounted on an arm 1 which is pivoted as shown at 3 with respect to bracket 2. The pedal 4 may have a pad mounted thereon to provide a wide surface for the driver to apply pressure, usually with his left foot, when the parking brake is applied, thereby swinging the pedal 4 in a counterclockwise direction as shown by the arrow C in the FIGURE. The forwardly extending portion of the arm 1 is formed as a segmental-shaped ratchet 1a, the center of which is eccentric to the pin 3. The forward end portion of the arm 1 is pivotally connected as at 8 to a clevis 7 to which the end of the parking brake cable 5 is attached by means of keyhole and grip 6 attached at the end of the cable. The spring has one end connected to a small hole 18 in the bracket 2 while the other end is connected to a small hole 19 in the arm 1 so that the pedal 4 is held in an elevated position by the tensioning effort of the spring 9. A projection 20 is provided on the arm 1 to limit the elevated position of the foot pedal 4, by cooperation with a stop 10 provided on the bracket 2. A pawl 11 is pivotally mounted on pin 15 with respect to bracket 2 and is urged toward the ratchet segment 1a by the tension of spring 21 fixed at one end to a lug 16 swedged outwardly from the bracket. A lever 14 is also mounted on the pin 15 for oscillatory movement as shown by dotted lines; the opposed end of said lever 14 being connected to a pull rod 12. The end of lever 14 adjacent pin 15 is provided with an outwardly swedged lug 14a. The pull rod 12 is reciprocatable in a bearing grommet 21a mounted in a hole 22 in the rear end of bracket 2 and has a coiled compression spring 17 mounted on rod 12 between the grommet 21a and an enlarged portion 12a on the pull rod 12, so that the spring 17 is compressed when the pull rod 12 is pulled rearwardly by the operator by manipulating the handle 23.

The lug 14a is engageable with the portion 24 extending upwardly from the pawl 11. The lug 14a holds the pawl 11 free of engagement with the ratchet segment 1a when the pull rod 12 is pulled as shown by the dotted line in the direction A, turning lever 14 through an angle in a clockwise direction as shown by the arrow B to the position indicated by the dotted line.

In operation, when the parking brake is to be applied, the driver depresses the pedal 4 along the arrow C as shown by the dotted line, thereby pulling upwardly the cable 5 attached to clevis 7, the segmental-shaped ratchet segment 1a eccentrically mounted at pivot 3 being turned through an angle in a counterclockwise direction as shown by arrow F by the movement of the pedal as shown by the dotted lines and thence being locked securely by means of the spring pressed pawl 11 so as to hold the parking brake in set condition. When the driver pulls rearwardly on the button-shaped handle 23, the pawl 11 is released against the bias of the spring 21. Pedal 4, immediately upon release swings back along the arrow E as shown by the dotted line either under the pull of the parking brake cable 5 or by the tensioning effort of spring 9. It is readily understood that the angular amount of such swing back is defined by the amount of pull on the pull rod, whereby a desired and moderate amount of release may be effected, since a displacement of the end of the pawl 11 from the teeth of the ratchet segment 1a will allow the ratchet segment to rotate only to a degree dependent on the amount of pull on the pull rod.

Since the moderate or medium release of a vehicle brake can be attained, the character of the present invention above described will alleviate a heavy burden which heretofore has been imposed on the driver, especially when the vehicle starts travel on a downwardly inclined road.

While one embodiment of the invention has been completely illustrated and described herein, it will be apparent that modification thereof may be made without departing from the scope of the invention as defined in the appended claims.

I claim:

1. A brake operating mechanism comprising a bracket, a braking arm pivotally mounted on said bracket and operatively connected to braking means, said arm being provided with a segment having ratchet teeth arcuately and eccentrically arranged about the axis about which said arm pivots, a pawl pivotally mounted on said bracket, spring means to cause said pawl to engage the ratchet teeth to hold said braking arm in working position, a manually operable release means to disengage said pawl from the ratchet tooth with which it is engaged and a return spring normally biasing said arm to release the braking means with one end thereof anchored to said bracket and the other end to said arm whereby a moderate release of braking force may be effected by correspondingly manipulating said release means by said pawl engaging another ratchet tooth.

2. A brake operating mechanism according to claim 1 wherein the teeth of said ratchet segment are formed adjacent one end of said braking arm.

3. A brake operating mechanism according to claim 1 wherein said release means includes a lever pivotally mounted on said bracket and a rod, said lever being connected at one end to said rod and the other end being engageable with said pawl, said rod being normally spring biased to cause said pawl to engage with said ratchet teeth and displaceable against said spring bias to cause said pawl to disengage from said ratchet teeth by movement of said lever.

4. A brake operating mechanism according to claim 1 wherein said pawl is normally spring biased to engage with said ratchet teeth.

5. A brake operating mechanism according to claim 1 wherein a stop means is provided on said bracket to stop movement of said braking arm so that a rest position of said braking arm is determined while maintaining a residual tension in said return spring to normally keep the brake cable under sufficient tension to provide prompt initial action at the next braking action.